United States Patent
Carlson

(10) Patent No.: US 9,294,860 B1
(45) Date of Patent: Mar. 22, 2016

(54) IDENTIFYING DIRECTIONS OF ACOUSTICALLY REFLECTIVE SURFACES

(71) Applicant: Rawles LLC, Wilmington, DE (US)

(72) Inventor: Ty Loren Carlson, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 96 days.

(21) Appl. No.: 14/203,108

(22) Filed: Mar. 10, 2014

(51) Int. Cl.
*H04B 3/20* (2006.01)
*H04R 29/00* (2006.01)
*H03G 3/00* (2006.01)

(52) U.S. Cl.
CPC .................................. *H04R 29/008* (2013.01)

(58) Field of Classification Search
CPC .. H04R 29/008; H04R 29/004; H04R 29/005; H04R 29/006; H04R 2430/20; H04R 2430/21; H04R 2430/23; H04R 1/20
USPC ....................................................... 381/66, 61
See application file for complete search history.

(56) References Cited

U.S. PATENT DOCUMENTS

| | | | |
|---|---|---|---|
| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2003/0118200 | A1* | 6/2003 | Beaucoup ............... H04M 3/56 381/110 |
| 2012/0223885 | A1 | 9/2012 | Perez |
| 2013/0039504 | A1* | 2/2013 | Pandey ................. H04M 9/082 381/71.1 |
| 2014/0270217 | A1* | 9/2014 | Ivanov ................. H04R 29/005 381/66 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Ammar Hamid
(74) *Attorney, Agent, or Firm* — Lee & Hayes, PLLC

(57) ABSTRACT

An audio device may be configured to produce output audio and to also capture input audio for speech recognition. Beamforming may be used to produce directional audio signals that emphasize sounds received from different directions. Acoustic echo cancellation (AEC) may be used to remove components of output audio from the directional input signals. AEC may be implemented by an adaptive filter based on dynamically optimized filter coefficients. The filter coefficients may be analyzed to detect the presence of potentially problematic reflective surfaces near the audio device. When such a reflective surface is detected, the user may be notified by illuminating a directional indicator on a housing of the audio device, where the directional indicator indicates the direction of the potentially problematic surface relative to the audio device.

21 Claims, 5 Drawing Sheets

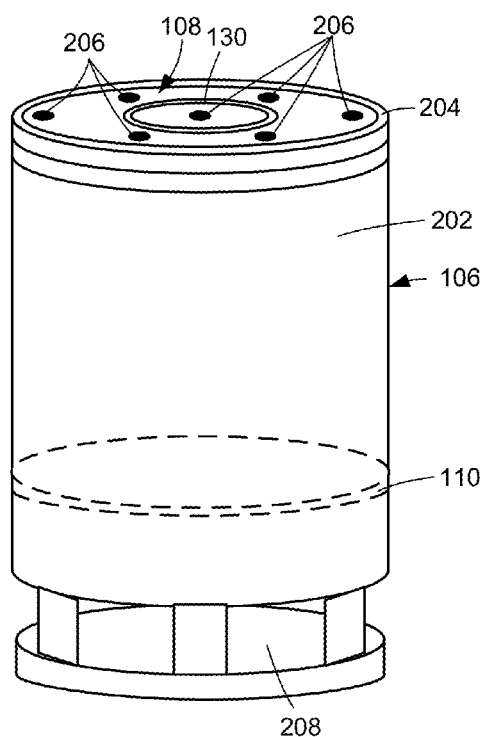
FIG. 2
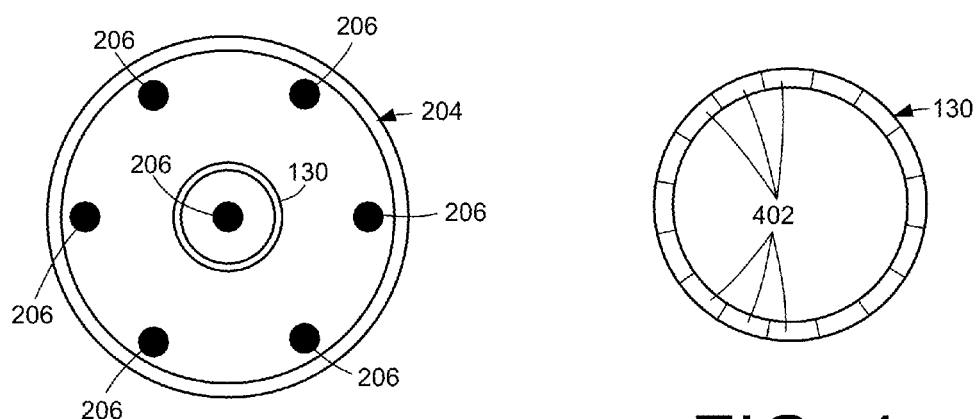
FIG. 3
FIG. 4

IDENTIFYING DIRECTIONS OF ACOUSTICALLY REFLECTIVE SURFACES

BACKGROUND

As the processing power available to devices and associated support services continues to increase, it has become practical to interact with users through speech. For example, various types of devices may generate speech or render other types of audio content for a user, and the user may provide commands and other input to the device by speaking.

In a device that produces sound and that also captures a user's voice for speech recognition, acoustic echo cancellation (AEC) techniques are used to remove device-generated sound from microphone input signals. The effectiveness of AEC in devices such as this is an important factor in the ability to recognize user speech in received microphone signals.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 is a front perspective view of an audio device in which the techniques described herein may be implemented.

FIG. 3 is a top view of the audio device shown in FIG. 2.

FIG. 4 is a top view of a directional display element that may be positioned on the top surface of the audio device shown in FIG. 2.

DETAILED DESCRIPTION

Figure 1:
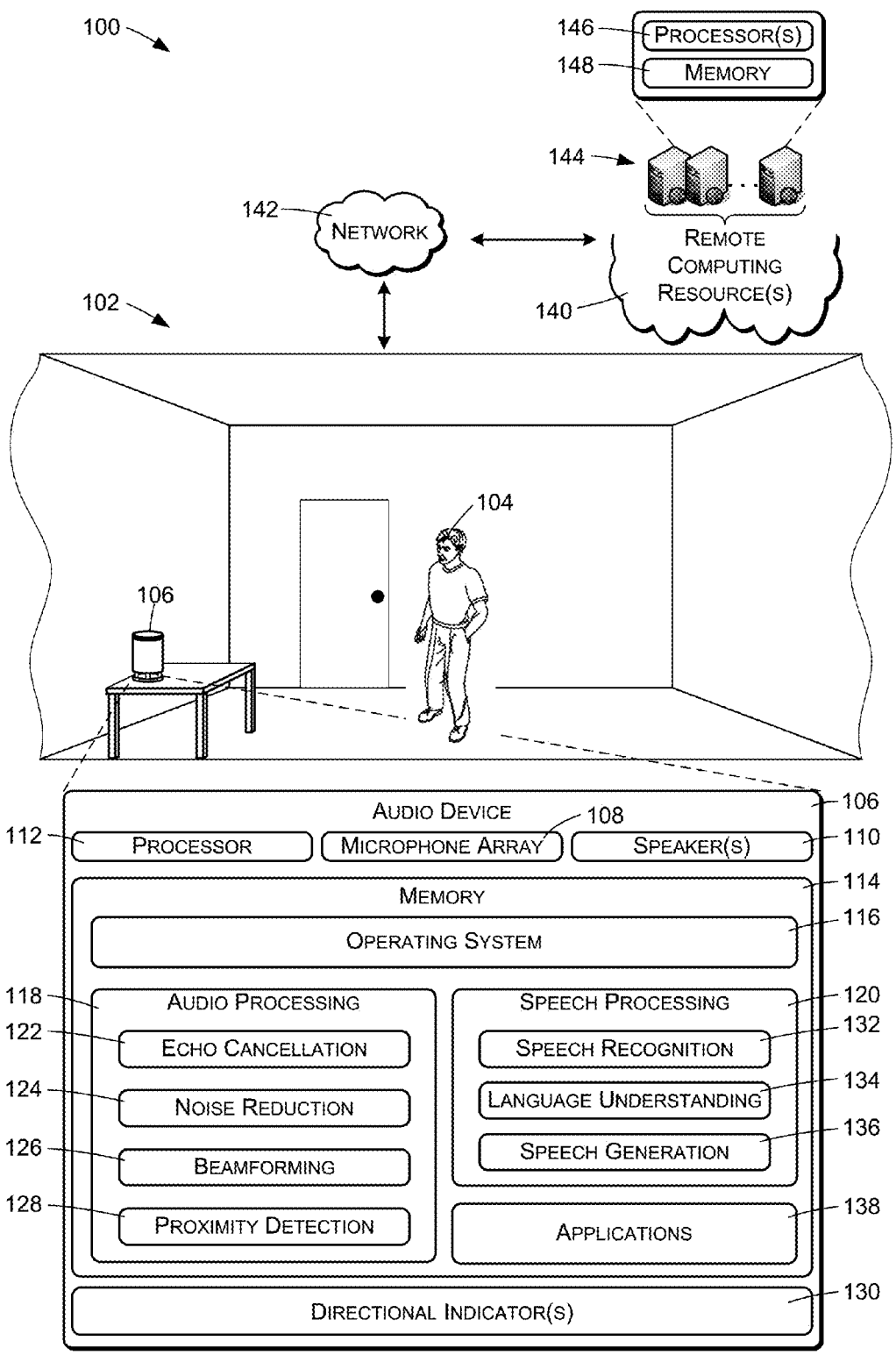
FIG. 1 is a block diagram of an illustrative voice interaction computing architecture that includes a voice-controlled audio device.

This disclosure pertains generally to an audio device having a speaker that produces sound and a microphone array that captures user speech and other sound. The captured sound may include the sound produced by the speaker. Speaker-generated sound captured by the microphone array may include echoes of the speaker-generated sound caused by acoustically reflective surfaces in the vicinity of the device.

The audio device uses audio beamforming techniques to produce directional audio signals based on microphone signals received from individual microphones of the microphone array. Acoustic echo cancellation (AEC) is applied to each of the directional audio signals to cancel speaker-generated sound. Speech recognition may then be applied to the directional audio signals in order to determine and act upon user voice input.

AEC may be implemented in part by an adaptive finite impulse response (FIR) filter associated with each directional audio signal. The FIR filter calculates and dynamically updates a set of filter parameters or coefficients that are used to estimate echo components of a directional audio signal. The FIR filter coefficients can be analyzed to determine the strengths of audio echoes and the distances of the acoustically reflective surfaces that cause the audio echoes.

In some cases, the audio device may be placed by a user very near an acoustically reflective surface, and the audio echo caused by the surface may be difficult to cancel because of the near proximity of the surface. This situation tends to reduce the performance of speech recognition components.

When speech recognition suffers, the device may attempt to diagnose environmental conditions that are detrimental to AEC, such as the nearness of highly reflective surfaces to the microphone array of the device. FIR filter coefficients may be analyzed to detect such surfaces. More specifically, the FIR filter coefficients calculated for each of the directional audio signals may be analyzed to determine both the existence of a problematic reflective surface near the device and the direction of the reflective surface relative to the device. This information may be reported to the user and/or support services so that the user can be instructed regarding how the device should be repositioned to improve its performance.

In embodiments described herein, the device is radially symmetric and lacks landmarks or features that may be referenced to specify directions relative to the device. For example, the device may be cylindrical and may have a circular top surface.

In order to indicate the direction of a potentially problematic reflective surface, lamps or other visual indicators may be positioned on the top surface so that they correspond visually to different directions. One or more of the visual indicators may be illuminated or activated in order to provide an indication of the direction of the problematic reflective surface. In response, the user may reposition the device away from the reflective surface.

FIG. 1 shows an illustrative voice interaction computing architecture 100 set in an environment 102, such as a home environment, that includes a user 104. The architecture 100 includes an electronic, voice-controlled audio device 106 with which the user 104 may interact. In the illustrated implementation, the audio device 106 is positioned on a table within a room of the environment 102. In other implementations, it may be placed in any number of locations (e.g., ceiling, wall, in a lamp, beneath a table, under a chair, etc.). Furthermore, more than one audio device 106 may be positioned in a single room, or one audio device 106 may be used to accommodate user interactions from more than one MOM.

Generally, the audio device 106 may have a microphone array 108 and one or more speakers 110 that produce sound omnidirectionally within the user environment to facilitate audio interactions with the user 104. The microphone array 108 has multiple individual microphones, each of which produces an audio signal containing or representing audio from the environment 102, such as sounds uttered from the user 104 or other sounds within the environment 102. The audio signal may also contain delayed and/or reflected audio components from the speaker 110.

The audio device 106 includes operational logic, which in many cases may comprise a processor 112 and memory 114.

The processor 112 may include multiple processors and/or a processor having multiple cores. The memory 114 may contain applications and programs in the form of instructions that are executed by the processor 112 to perform acts or actions that implement desired functionality of the audio device 106. The memory 114 may be a type of computer storage media and may include volatile and nonvolatile memory. Thus, the memory 114 may include, but is not limited to, RAM, ROM, EEPROM, flash memory, or other memory technology.

The audio device 106 may have an operating system 116 that is configured to manage hardware and services within and coupled to the audio device 106. In addition, the audio device 106 may include audio processing components 118 and speech processing components 120.

The audio processing components 118 may include functionality for processing input audio signals generated by the microphone array 108 and/or output audio signals provided to the speaker 110. As an example, the audio processing components 118 may include one or more acoustic echo cancellation or suppression components 122 for reducing acoustic echo in microphone input signals, generated by acoustic coupling between the microphone array 108 and the speaker 110. The audio processing components 118 may also include a noise reduction component 124 for reducing noise in received audio signals, such as elements of audio signals other than user speech.

The audio processing components 118 may include one or more audio beamformers or beamforming components 126 that are configured to generate or produce multiple directional audio signals from the input audio signals received from the microphone array 108. More specifically, the beamforming components 126 may be responsive to a plurality of spatially separated microphones of the microphone array 108 to produce directional audio signals that emphasize sounds originating from different directions relative to the audio device 106 and to select and output one of the audio signals that is most likely to contain user speech.

Audio beamforming, also referred to as audio array processing, uses signals from multiple microphones. Sound originating from a source is received by each of the microphones. However, because each microphone is at a different distance from the sound source, a propagating sound wave arrives at each of the microphones at slightly different times. This difference in arrival times results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

The audio processing components 118 may further include a proximity detection component 128, also referred to as a proximity detector 128. The proximity detector 128 is responsive to parameters or other data produced by the beamforming components 126 to identify one of the directional audio signals that contains an acoustic echo originating from an acoustically reflective surface near the audio device 106. In particular, the proximity detector 128 is configured to detect a nearby acoustic surface causing echoes that are detrimental to echo cancellation and/or speech recognition. The proximity detector is further configured to indicate the direction of the detected acoustic surface relative to the audio device 106.

The audio device 106 may include one or more visual directional indicators 130 that are controllable by the proximity detector 128 to visually indicate different directions relative to the audio device 106 and/or the housing of the audio device. Upon detecting an acoustically reflective surface that is detrimental to AEC or speech recognition, the proximity detector 128 controls the visual indicators 130 to indicate the direction of the reflective surface relative to the device 106.

The speech processing components 120 receive an input audio signal that has been processed by the audio processing components 118 and perform various types of processing in order to understand the intent expressed by human speech. The speech processing components 120 may include an automatic speech recognition component 132 that recognizes human speech in an audio signal. The speech processing components 120 may also include a natural language understanding component 134 that is configured to determine user intent based on recognized speech of the user.

The speech processing components 120 may also include a text-to-speech or speech generation component 136 that converts text to audio for generation by the speaker 110.

The audio device 106 may include a plurality of applications 138 that are configured to work in conjunction with other elements of the audio device 106 to provide services and functionality. The applications 138 may include media playback services such as music players. Other services or operations performed or provided by the applications 138 may include, as examples, requesting and consuming entertainment (e.g., gaming, finding and playing music, movies or other content, etc.), personal management (e.g., calendaring, note taking, etc.), online shopping, financial transactions, database inquiries, and so forth. In some embodiments, the applications may be pre-installed on the audio device 106, and may implement core functionality of the audio device 106. In other embodiments, one or more of the applications 138 may be installed by the user 104, or otherwise installed after the audio device 106 has been initialized by the user 104, and may implement additional or customized functionality as desired by the user 104.

In certain embodiments, the primary mode of user interaction with the audio device 106 is through speech. In an embodiment described herein, the audio device 106 receives spoken commands from the user 104 and provides services in response to the commands. For example, the user may speak predefined commands (e.g., "Awake"; "Sleep"), or may use a more casual conversation style when interacting with the audio device 106 (e.g., "I'd like to go to a movie. Please tell me what's playing at the local cinema."). Provided services may include performing actions or activities, rendering media, obtaining and/or providing information, providing information via generated or synthesized speech via the audio device 106, initiating Internet-based services on behalf of the user 104, and so forth.

In some embodiments, the audio device 106 may operate in conjunction with or may otherwise utilize computing resources 140 that are remote from the environment 102. For instance, the audio device 106 may couple to the remote computing resources 140 over a network 142. As illustrated, the remote computing resources 140 may be implemented as one or more servers or server devices 144. The remote computing resources 140 may in some instances be part of a network-accessible computing platform that is maintained and accessible via a network 142 such as the Internet. Common expressions associated with these remote computing resources 140 may include "on-demand computing", "software as a service (SaaS)", "platform computing", "network-accessible platform", "cloud services", "data centers", and so forth.

Each of the servers 144 may include processor(s) 146 and memory 148. The servers 144 may perform various functions in support of the audio device 106, and may also provide additional services in conjunction with the audio device 106. Furthermore, one or more of the functions described herein as being performed by the audio device 106 may be performed instead by the servers 144, either in whole or in part. As an example, the servers 144 may in some cases provide the functionality attributed above to the speech processing components 120. Similarly, one or more of the applications 138 may reside in the memory 148 of the servers 144 and may be executed by the servers 144.

The audio device 106 may communicatively couple to the network 142 via wired technologies (e.g., wires, universal serial bus (USB), fiber optic cable, etc.), wireless technologies (e.g., radio frequencies (RF), cellular, mobile telephone networks, satellite, Bluetooth, etc.), or other connection technologies. The network 142 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, etc.), and/or other connection technologies.

FIG. 2 illustrates an example embodiment of the audio device 106. In this embodiment, the audio device 106 comprises a cylindrical housing 202 having a circular top surface 204. The microphone array 108 is formed by multiple input microphones or microphone elements 206 that are supported by or positioned on the top surface 204. One of the input microphones 206 is positioned at the center of the top surface 204. Other microphones 206 are arranged around the outward edge of the top surface 204. The microphones 206 of the microphone array 108 are laterally spaced from each other so that they can be used by the audio beamforming components 126 to produce directional audio signals. In the illustrated embodiment, the input microphones 206 are positioned in a circle or hexagon on the top surface 204 of the housing 202. In various embodiments, the microphone array 108 may include greater or less than the number of microphones shown for producing directionally focused audio signals.

The speaker 110 may also be supported or contained by the housing. The speaker 110 may be positioned within and toward the bottom of the housing 202, and may be configured to emit sound omnidirectionally, in a 360 degree pattern around the audio device 106. For example, the speaker 110 may comprise a round speaker element directed downwardly in the lower part of the housing 202, to radiate sound radially through an omnidirectional opening or gap 208 in the lower part of the housing 202.

The directional indicators 130 may be positioned on the circular top surface 204 of the housing 202. In this embodiment, the directional indicators comprise a ring-shaped display element having multiple segments that can be individually activated and illuminated.

FIG. 3 shows the top surface 204 of the device 106 in more detail. As illustrated, the microphones 206 are positioned at the center and around the edges of the circular top surface 204. The ring-shaped directional indicators 130 are positioned concentrically in or on the top surface 204.

FIG. 4 shows further details of the ring-shaped visual indicators 130. The visual indicators 130 comprises a plurality of elements or segments 402, each of which can be individually illuminated. In some embodiments, each segment 402 may be capable of displaying different colors, intensities, or temporal patterns. In a particular embodiment, each of 30 segments may comprise an LED (light-emitting diode) or multi-color LED.

Figure 5:
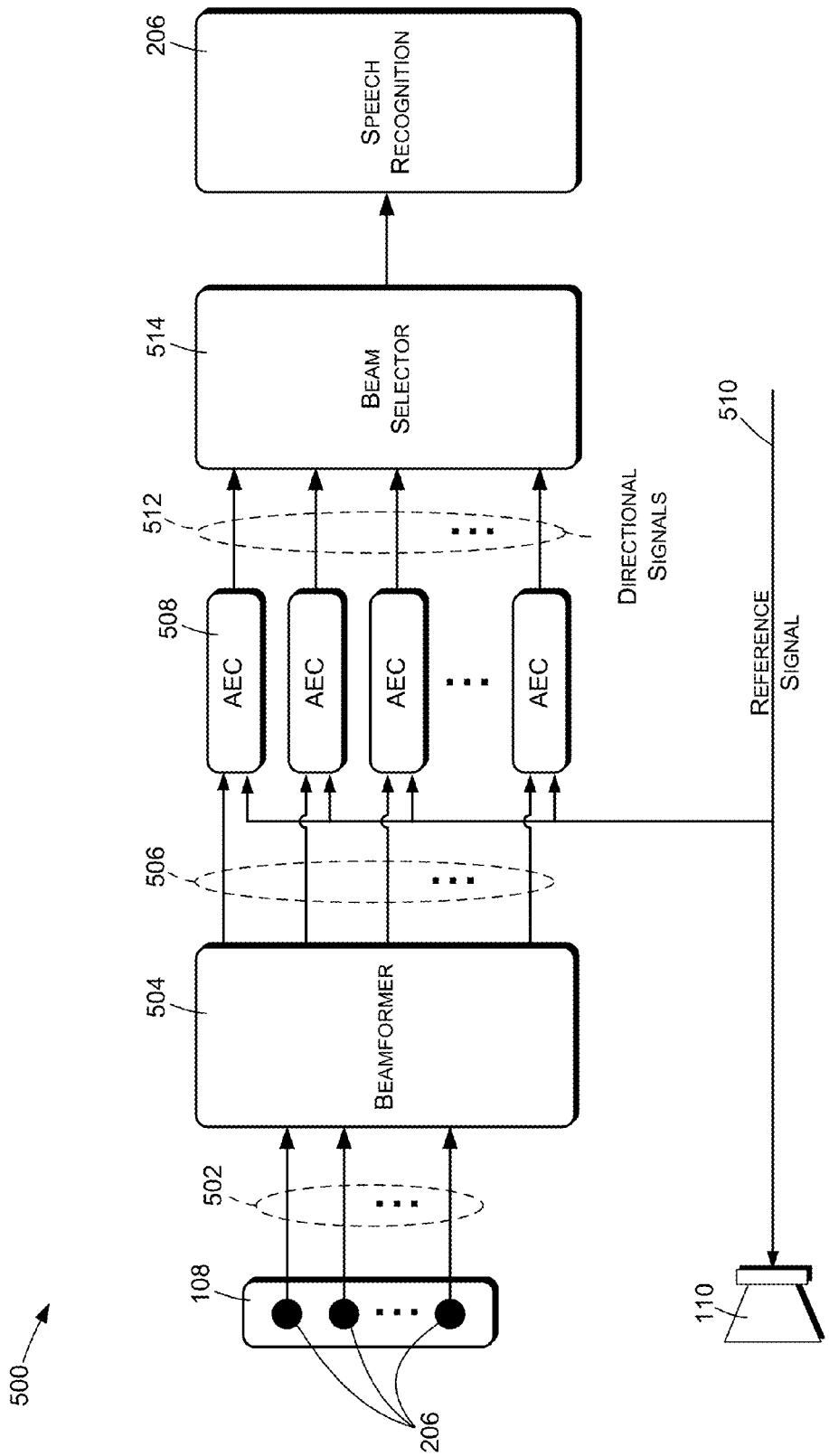
FIG. 5 is a block diagram illustrating an audio processing configuration that may be implemented by the audio device of FIG. 1 and/or by components associated with the audio device.

FIG. 5 illustrates an example signal processing configuration 500 that may be implemented by the audio device 106. In the following discussion, audio signals are assumed to be digital signals, such that each digital signal comprises a continuous sequence of digital values. Digital signal values such as this are sometimes referred to as signal samples or sample values.

The microphone array 108 produces multiple input audio signals 502. Each of the input audio signals 502 is produced by a different microphone 206 of the microphone array 108. A beamforming component or beamformer 504 receives the input audio signals 502, which are non-directional, and processes the input audio signals 502 to produce multiple directional audio signals 506. Each directional audio signal 506 contains or emphasizes sound from a different direction relative to the microphone array 108. Each directional audio signal 506 potentially contains one or more acoustic echoes of the output audio, caused by reflective surfaces in the vicinity of the device 106.

Each directional audio signal 506 is received by a respectively corresponding acoustic echo cancellation (AEC) component 508, also referred to herein as an acoustic echo canceller 508. Generally, each AEC component 508 is configured to cancel one or more acoustic echoes from the corresponding directional audio signal 506. More specifically, each AEC component 508 is responsive to a reference signal 510 to produce a corresponding echo-cancelled directional audio signal 512 from which echoed components of speaker output are removed or cancelled. The reference signal 510 is an audio signal that contains the audio produced by the speaker 110. More specifically, the reference signal 510 may comprise an audio signal used to drive the speaker 110.

In some embodiments, a beam selector 514 may be used to select one of the echo-cancelled directional audio signals 512 for further processing. For example, the beam selector 514 may analyze the audio signals 512 to determine which of the audio signals 512 is most likely to contain speech, and may select that audio signal for further processing such as speech recognition.

Figure 6:
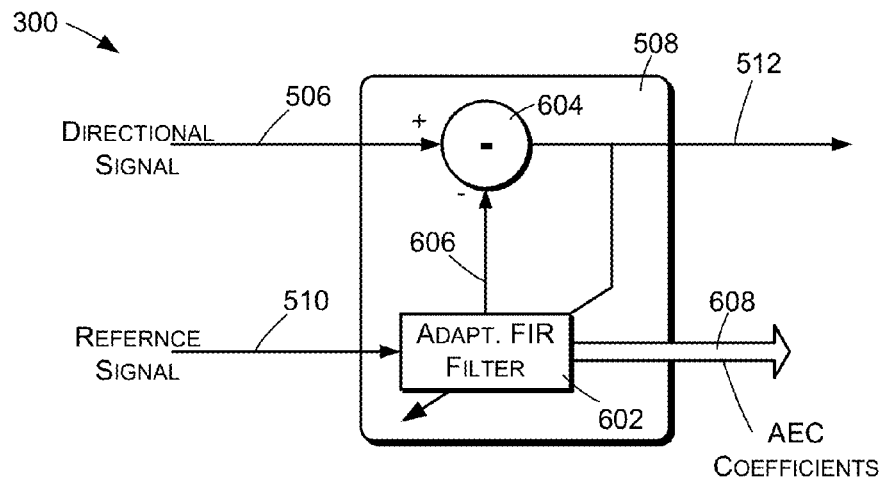
FIG. 6 is a block diagram of an acoustic echo canceller such as may be used in the audio processing configuration shown by FIG. 5.

FIG. 6 shows an example implementation of an AEC component 508. In the described embodiment, the AEC component 508 may be implemented by a finite impulse response (FIR) filter 602 and a subtraction component 604. The FIR filter 602 generates an estimated echo signal 606, which represents one or more components of the reference signal 510 that are present in the directional audio signal 506. The estimated echo signal 606 is subtracted from the directional audio signal 506 by the subtraction component 604 to produce the echo-cancelled directional audio signal 512.

The FIR filter 602 estimates echo components of the directional audio signal 506 by generating and repeatedly updating a sequence of AEC coefficients 608, which are also referred to herein as cancellation parameters or filter parameters 608, and by applying the AEC coefficients 608 respectively to a sequence of most recently received sample values of the reference signal 510. The adaptive FIR filter 602 calculates and dynamically updates the coefficients 608 so as to continuously and adaptively minimize the signal power of the echo-cancelled directional audio signal 512, which is referred to as the "error" signal in the context of adaptive filtering.

Figure 7:
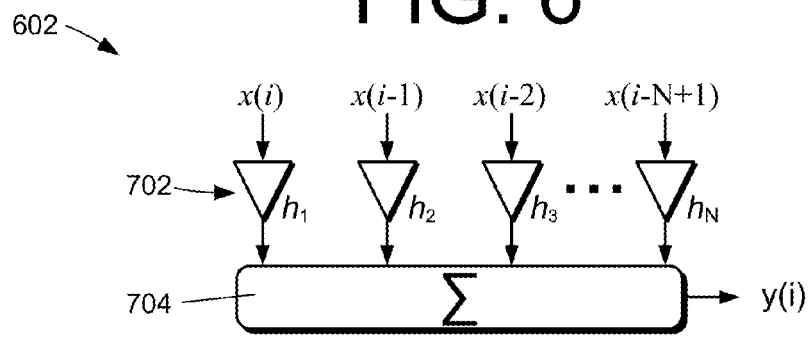
FIG. 7 is a block diagram of a finite impulse response (FIR) filter such as may be used in the acoustic echo canceller shown by FIG. 6.

FIG. 7 shows an example of an FIR filter 602 such as may be used in the AEC component 508. The FIR filter 602 receives the reference signal 510 in the form of sampled reference values x(i) through x(i−N+1), where N is the filter order of the filter 602. A plurality of multipliers 702 are used to multiply the reference values by respective coefficients or weights $h_1$ through $h_N$. The resulting products are summed by a summing function 704 to form a sample value y(i) of the estimated echo signal 606, which corresponds in time sequence to the currently received value of the directional audio signal 506. Thus, the estimated echo signal 606 comprises a weighted summation of previous values of the reference signal 510. The multipliers 702 of the FIR filter 602 are referred to as taps, and the number of taps defines the order of the filter 602.

The filter coefficients h are calculated dynamically and updated iteratively as new input and reference signal samples are received. The calculations of the filter coefficients 608 may be performed using various techniques. For example, AEC coefficients may be calculated using normalized least mean square algorithm or total least square algorithms, with the objective of minimizing the signal power of the echo-cancelled directional audio signal 512.

The filter coefficients h are generated as a temporal sequence, where each coefficient of the sequence corresponds to a respective point in time prior to the current time. A peak in the sequence of coefficients corresponds to a prominent echo of the reference signal 510 in the directional audio signal 506. The relative position of the peak within the sequence indicates the time of propagation of the echo from the speaker 110 to the microphone array 108. The magnitude of the peak indicates the strength of the echo. Because echoes are normally caused by reflective surfaces, the distances of reflective surfaces from the microphone array may be determined by analyzing the coefficients produced by the FIR filter 602, based on the known propagation speed of sound.

Figure 8:
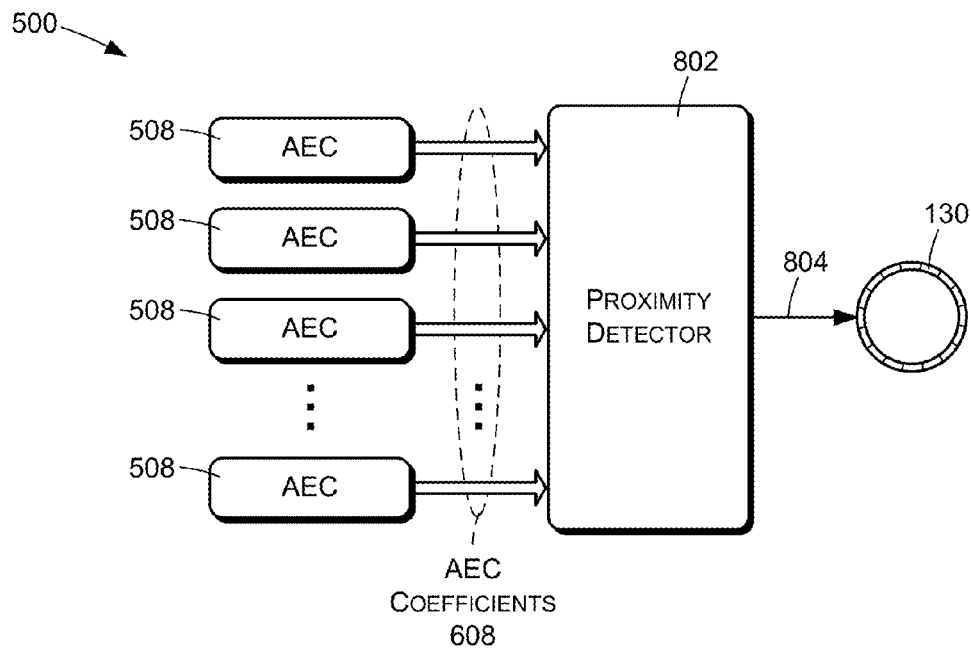
FIG. 8 is a block diagram illustrating further details of the audio processing configuration of FIG. 5.

FIG. 8 illustrates further elements that may be incorporated in the signal processing configuration 500. More specifically, FIG. 8 illustrates proximity detection functionality that may be implemented in conjunction with the AEC components 508 of FIG. 5. The proximity detection functionality may be initiated in some embodiments in response to a detected impairment of speech recognition.

As described above, the AEC components 508 generate or produce AEC coefficients 608 as part of their operation. In the example embodiment shown, the AEC coefficients 608 produced by each AEC component 508 are received by a proximity detector 802. The proximity detector 802 may comprise or may be part of the proximity detection component 128 shown in FIG. 1.

The proximity detector 802 receives a sequence of dynamically updated AEC coefficients corresponding to each of the directional audio signals 506, each of which corresponds in turn to a particular direction relative to the device 106. Generally, the proximity detector 802 is configured to analyze the sequences of filter coefficients to identify one of the directional audio signals that contains an acoustic echo originating from an acoustically reflective surface nearby or within a threshold distance of the device 106 or housing 202. In response to identifying such a reflective surface, the proximity detector 802 is configured to control the one or more directional indicators 130 to indicate the direction corresponding to the identified one of the directional audio signals.

For each direction, the proximity detector 802 analyzes the corresponding AEC coefficients to determine the distance of the nearest acoustically reflective surface and the magnitude of the echo produced by the reflective surface. The proximity detector 802 then compares the distance and magnitude to thresholds or other criteria to determine whether the reflective surface may be detrimental to echo cancellation and/or speech recognition. Surfaces that are within a threshold distance and produce echoes of at least a threshold magnitude are considered detrimental to echo cancellation and/or speech recognition. If a detected reflective surface is determined to be a likely detriment to echo cancellation or speech recognition, the proximity detector 802 produces a signal 804 indicating the direction of the problematic surface relative to the audio device 106.

In some cases, the signal 804 may comprise a control signal that activates and/or illuminates one of the segments of the directional indicator segments 402 that is nearest to or that faces in the direction corresponding to the detected reflective surface. This provides a notification to the user of the device 106 that there is a potential problem, and indicates the direction of the reflective surface that may be causing a problem.

In some embodiments, the proximity detector 802 may be configured to indicate more than one nearby surface that is so close as to possibly impair audio analysis or that meets given criteria. For example, the proximity detector 802 may identify any acoustically reflective surfaces that are within a threshold distance and/or generate echoes that exceed a threshold magnitude, and may illuminate those directional indicator segments 402 that face in the corresponding directions.

Furthermore, in some embodiments the proximity detector 802 may be alternatively configured to illuminate those indicator segments that are opposite the identified reflective surface or surfaces, to indicate a direction in which the audio device should be moved.

Figures 9, 10:
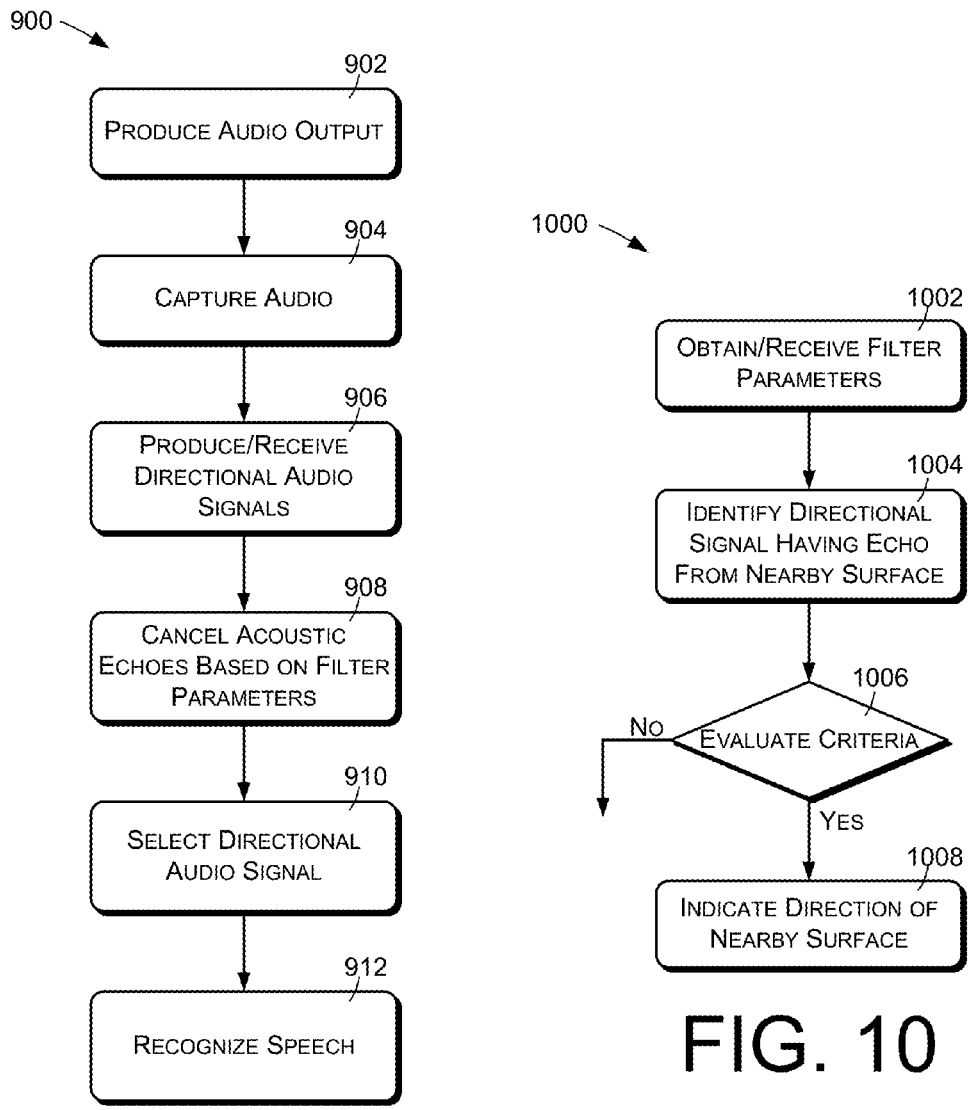
FIG. 9 is a flow diagram illustrating an example method of processing audio such as may be employed by the audio device shown in FIG. 1.
FIG. 10 is a flow diagram illustrating an example method of indicating the presence of nearby acoustically reflective surfaces that are potentially problematic to speech recognition.

FIG. 9 illustrates an example of a method 900 that may be implemented by the audio device 106 or other types of devices to process audio that potentially includes user speech.

An action 902 comprises producing audio output at the speaker 110 of the device 106. The audio output may comprise speech, music, or other sound.

An action 904 comprises capturing audio with multiple microphones 206 of the microphone array 108. The microphones 206 may be positioned at known distances from each other so that they can be used for beamforming. The captured audio may include user speech and other environmental sound, and may also include echoes of the audio output. Each microphone 206 produces an input audio signal 502.

An action 906 comprises producing and/or receiving multiple directional audio signals 506. The directional audio signals 506 may be produced using beamforming techniques based on the input audio signals 502 produced by different microphones 206.

An action 908 comprises cancelling acoustic echoes of the audio output in each of the directional audio signals 512, based on filter parameters such as the FIR filter coefficients 608 described above. In particular, the action 908 may include applying an adaptive FIR filter 602 to each of the directional audio signals 506, where the FIR filter 602 estimates echoed components of the audio output based at least in part on a reference signal 510 that is used to drive the device speaker 110. The resulting signals are referred to herein as echo-cancelled directional audio signals 512.

An action 910 comprises selecting one or more of echo-canceled directional audio signals 512 for further processing. For example, the action 910 may comprise evaluating each of the echo-canceled directional audio signals 512 to detect the likely presence of speech. The signal or signals exhibiting the highest likelihood of containing speech may be selected for further processing.

An action 912 comprises recognizing speech in the selected echo-canceled directional audio signal or signals. The action 912 may be performed using various speech recognition techniques.

FIG. 10 illustrates an example of a method 1000 that may be implemented within the device 106 or other devices to provide guidance to a user of the device regarding corrective actions that may be taken when environmental conditions impair performance of the device 106.

In some embodiments, the actions depicted by FIG. 10 may be performed continuously or at periodically intervals to check for the existence of a problematic nearby surface and to notify the user of any such surface. In other embodiments, the depicted actions may be performed in response to a condition, signal, or status indicating the possibility that a nearby reflective surface is causing problems. For example, the speech recognition component 206 may detect and indicate an impairment in the ability to recognize speech in one or more of the echo-cancelled audio signals 512. In some cases, speech recognition components may produce confidence indicators or levels indicating the likely accuracy of speech recognition. Such a confidence level may be compared to a threshold to detect recognition impairment.

As another example, AEC components 508 or other system components may provide flags or signals indicating poor audio quality, difficulties with echo suppression, or unusually high levels of reverberation. Similarly, the beam selector 514 may experience problems in detecting voice activity in any of the directional signals 512, despite high energy levels of the signals 512.

In some cases, the actions of FIG. 10 may be performed during an initialization process during which a test sound in played by the speaker 110. Furthermore, the actions of FIG. 10 may be performed as part of a diagnostic mode or procedure.

An action 1002, performed in response to detecting recognition impairment, comprises obtaining or receiving AEC filter parameters or coefficients 608, such as the parameters produced by the AEC components 508 that are applied to each of the directional audio signals 506.

An action 1004, also performed in response to detecting recognition impairment, comprises identifying one of the directional audio signals 506 that contains an acoustic echo of the output audio caused by a nearby acoustically reflective surface.

The action 1004 may comprise analyzing the AEC filter coefficients 608 corresponding to each of the directional audio signals 506. For each directional audio signal 506, the nearest reflective surface is identified by finding a corresponding peak in the sequence of coefficients produced by the adaptive filter 602 associated with the directional audio signal.

An action 1006 comprises evaluating predefined criteria to determine whether any reflective surfaces identified in the action 1004 may be problematic to echo cancellation. This may include determining whether a nearby acoustically reflective surface is within a threshold proximity of the device 106 and/or whether the acoustic echo contained by the directional audio signal has a strength that exceeds a strength threshold. More specifically, the peak coefficient identified for each of the directional audio signals is compared to a distance or proximity threshold and/or to a strength or magnitude threshold.

The coefficients of each sequence of coefficients correspond to echo strengths at increasing acoustic path lengths. The peak coefficient found in the action 1004 corresponds to an acoustically reflective surface and to an acoustic path length representing the time of propagation from the device speaker, to the reflective surface, and back to the device microphone. The action 1006 may comprise comparing the path length to a length threshold and comparing the value of the peak coefficient to an echo strength threshold. If the path length is less than the length threshold and the value of the peak coefficient is greater than the echo strength threshold, the surface and its associated reflections or echoes may be deemed to be problematic for echo cancellation.

If no problematic reflective surfaces are found in the action 1006, no further actions are performed. However, if a peak is found that meets the criteria of the action 1006, an action 1008 is performed of indicating the direction corresponding to the directional audio signal 506 in which the problematic echo is detected, which in turn corresponds to the direction of the of the problematic reflective surface. In the described embodiment, this may comprise activating or illuminating one of the segments 402 of the directional indicator 130 that corresponds to the direction of the directional audio signal 506 in which the peak coefficient was found.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. An audio device, comprising:
   a housing;
   a speaker to generate output audio;
   multiple microphones to produce input audio signals;
   one or more audio beamformers configured to produce multiple directional audio signals from the input audio signals, wherein each of the directional audio signals potentially contains one or more acoustic echoes of the output audio, and wherein each of the directional audio signals emphasizes sound received from a corresponding direction relative to the audio device;
   one or more visual indicators, the one or more visual indicators being controllable to visually indicate different directions relative to the audio device;
   one or more acoustic echo cancellers configured to cancel the one or more acoustic echoes from the directional audio signals based at least in part on sequences of dynamically updated filter coefficients;
   a proximity detector configured to perform acts comprising:
      analyzing the sequences of dynamically updated filter coefficients to identify one of the directional audio signals that contains an acoustic echo originating from a nearest of one or more acoustically reflective surfaces; and
      controlling the one or more visual indicators to indicate the direction of the nearest of the one or more acoustically reflective surfaces.

2. The audio device of claim 1, wherein the coefficients of each sequence correspond to echo strengths at respectively corresponding acoustic path lengths, the analyzing further comprising, for an individual sequence:
   identifying a peak coefficient in the sequence, wherein the peak coefficient corresponds to a first reflection of the output audio and to a particular one of the acoustic path lengths;
   comparing the particular one of the acoustic path lengths to a length threshold; and
   comparing the peak coefficient to an echo strength threshold.

3. The audio device of claim 1, wherein the proximity detector is configured to perform the acts in response to a detected impairment of speech recognition.

4. The audio device of claim 1, wherein:
the housing is cylindrical and has a circular top surface;
the one or more visual indicators comprise a ring-shaped display element on the top surface of the housing; and
controlling the one or more visual indicators comprises illuminating a portion of the display element that corresponds to the direction of the nearest of the one or more acoustically reflective surfaces.

5. The audio device of claim 1, wherein each of the one or more acoustic echo cancellers comprises a finite impulse response filter that is responsive to a corresponding one of the sequences of coefficients.

6. A device comprising:
a speaker configured to generate output audio;
a microphone array configured to produce multiple input audio signals;
one or more audio beamformers configured to produce multiple directional audio signals from the input audio signals, wherein each directional audio signal potentially contains one or more acoustic echoes of the output audio;
one or more acoustic echo cancellers configured to cancel the one or more acoustic echoes from each of the directional audio signals; and
a proximity detector configured to perform acts comprising:
identifying at least one of the directional audio signals that contains an acoustic echo of the output audio caused by a nearby acoustically reflective surface that is within a threshold proximity of the device; and
providing a proximity indication that is based at least in part on the direction corresponding to the identified one of the directional audio signals.

7. The device of claim 6, wherein the proximity indication specifies the direction corresponding to the identified one of the directional audio signals to identify the direction of the nearby acoustically reflective surface.

8. The device of claim 6, wherein the proximity indication specifies a direction opposite to the direction corresponding to the identified one of the directional audio signals to identify a direction in which the device should be moved.

9. The device of claim 6, further comprising one or more visual indicators that are controllable to visually indicate different directions relative to the device, wherein providing the proximity indication comprises controlling the one or more visual indicators.

10. The device of claim 6, wherein the acoustic echo has a strength that exceeds a strength threshold.

11. The device of claim 6, wherein the identifying and providing are performed by the proximity detector in response to detected impairment of recognizing speech in one or more of the directional audio signals.

12. The device of claim 6, wherein:
each of the one or more acoustic echo cancellers comprises an adaptive filter that dynamically generates a plurality of filter parameters indicating (a) strengths of the acoustic echoes and (b) proximities of acoustically reflective surfaces that cause the acoustic echoes; and
the proximity detector is configured analyze the filter parameters to identify the at least one of the directional audio signals that contains the acoustic echo of the output audio.

13. The device of claim 12, wherein the adaptive filter comprises an adaptive finite impulse response (FIR) filter.

14. The device of claim 12, wherein analyzing the filter parameters comprises:
comparing the strength of the acoustic echo of the output audio caused by the nearby acoustically reflective surface to a strength threshold; and
comparing the proximity of the nearby acoustically reflective surface to a proximity threshold.

15. A method comprising:
receiving multiple directional audio signals based at least in part on input audio signals produced by multiple microphones;
cancelling acoustic echoes that are potentially present in the directional audio signals due to one or more acoustically reflective surfaces, wherein the cancelling is based on dynamically calculated parameters that indicate proximities of the one or more acoustically reflective surfaces to the multiple microphones;
analyzing the dynamically calculated parameters to identify at least one of the directional audio signals having an acoustic echo caused by one of the one or more acoustically reflective surfaces within at least a threshold proximity of the multiple microphones;
providing an indication that is based at least in part on the direction corresponding to the identified at least one of the directional audio signals.

16. The method of claim 15, further comprising analyzing the dynamically calculated parameters to identify at least one of the directional audio signals having an acoustic echo exceeding a threshold magnitude.

17. The method of claim 15, wherein the proximity indication specifies the direction corresponding to the identified one of the directional audio signals.

18. The method of claim 15, wherein the proximity indication specifies a direction opposite to the direction corresponding to the identified one of the directional audio signals.

19. The method of claim 15, wherein the cancelling uses an adaptive filter and the dynamically calculated parameters comprise filter coefficients that are dynamically updated by the adaptive filter.

20. The method of claim 15, wherein the analyzing and providing are performed in response to a detected impairment of recognizing speech in one or more of the directional audio signals.

21. The method of claim 15, further comprising performing acoustic beamforming to produce the multiple directional audio signals based at least in part on the input audio signals.

* * * * *